(12) United States Patent
Zhu et al.

(10) Patent No.: US 11,285,069 B2
(45) Date of Patent: Mar. 29, 2022

(54) PASSIVELY BALANCED LOAD-ADAPTIVE UPPER-LIMB EXOSKELETON (71) Applicant: Harbin Institute of Technology, Harbin (CN)

(72) Inventors: Yanhe Zhu, Harbin (CN); Guoan Zhang, Harbin (CN); Hongwu Li, Harbin (CN); Jie Zhao, Harbin (CN)

(*) Notice: Subject to any disclaimer, the term of this patent is extended or adjusted under 35 U.S.C. 154(b) by 373 days.

(21) Appl. No.: 16/480,291

(22) PCT Filed: May 16, 2017

(86) PCT No.: PCT/CN2017/084433
§ 371 (c)(1),
(2) Date: Jul. 23, 2019

(87) PCT Pub. No.: WO2018/149039
PCT Pub. Date: Aug. 23, 2018

(65) Prior Publication Data
US 2019/0380903 A1 Dec. 19, 2019

(30) Foreign Application Priority Data

Feb. 17, 2017 (CN) .......................... 201710086938.3

(51) Int. Cl.
*A61H 1/02* (2006.01)
*B25J 9/00* (2006.01)

(52) U.S. Cl.
CPC .......... *A61H 1/0277* (2013.01); *B25J 9/0006* (2013.01); *A61H 2201/1238* (2013.01);
(Continued)

(58) Field of Classification Search
CPC .......... A61H 1/0277; A61H 2201/1238; A61H 2201/1454; A61H 2201/1616;
(Continued)

(56) References Cited

U.S. PATENT DOCUMENTS

| | | | | |
|---|---|---|---|---|
| 5,685,830 A | * | 11/1997 | Bonutti | ................. A61F 5/0123 601/33 |
| 2004/0243025 A1 | * | 12/2004 | Peles | .................... A61H 1/0277 601/5 |
| 2009/0069733 A1 | * | 3/2009 | Bonutti | .................. A61H 1/024 602/16 |

* cited by examiner

*Primary Examiner* — Quang D Thanh
(74) *Attorney, Agent, or Firm* — Novoclaims Patent Services LLC; Mei Lin Wong (57) ABSTRACT A passively balanced load-adaptive upper limb exoskeleton. An upper arm (A), an elbow (B), a forearm (C), and a hand (D) are arranged sequentially from left to right. An upper arm upper rod (A1) and an upper arm lower rod (A2) each are hinge-connected to an upper arm elbow housing via a bearing. A forearm upper rod (C1) and a forearm lower rod (C2) each are hinge-connected to a forearm elbow housing via a bearing. An upper arm support rod (E) is disposed between an upper arm driving mechanism (A4) and an upper arm elbow assembly (B1). One end of the upper arm support rod is fixedly connected to two upper arm support rod slide blocks (9) in the upper arm driving mechanism, and the other end thereof is hinge-connected to protruding shafts on two sides of an upper arm lead screw nut connection member via bearings. A forearm-upper arm support rod is disposed between a forearm driving mechanism (C4) and a forearm elbow assembly (B2). One end of the forearm-upper arm support rod (K) is fixedly connected to two upper arm support rod slide blocks in the forearm driving mechanism, and the other end thereof is hinge-connected to protruding shafts on two sides of a forearm lead screw nut connection member via bearings. The hand is hinge-connected to a wrist. The upper limb exoskeleton of the invention is used to facilitate handling of heavy goods or carrying of certain items.

3 Claims, 5 Drawing Sheets (52) U.S. Cl.
CPC ............ *A61H 2201/1454* (2013.01); *A61H 2201/1616* (2013.01); *A61H 2201/1638* (2013.01); *A61H 2201/1676* (2013.01); *A61H 2201/5061* (2013.01)

(58) Field of Classification Search
CPC .... A61H 2201/1638; A61H 2201/1676; A61H 2201/5061; B25J 9/0006; B25J 9/102; B25J 19/0012; B25J 9/1065; B25J 9/00; B25J 9/0009; B25J 17/02; B25J 18/00
See application file for complete search history.

PASSIVELY BALANCED LOAD-ADAPTIVE UPPER-LIMB EXOSKELETON

FIELD OF INVENTION

The present invention relates to an exoskeleton robot, and more particularly to a load-adapting passive balancing upper limb exoskeleton.

DESCRIPTION OF RELATED ARTS

At present, the upper-limb passive exoskeleton robot is favored by the majority of researchers because of its unique combination of man and machine. The existing upper-limb passive exoskeleton mostly utilizes a spring for providing the main driving force to achieve balance. When changes to the load occurs during working conditions, it is basically relied on manual adjustment. This kind of structure not only has a low load quality, but also has a great limitation on its balance effect and cannot satisfy the gravity balance conditions at various angles. Also, the adjustment process is too cumbersome and so the work efficiency is reduced.

SUMMARY OF THE PRESENT INVENTION

In order to overcome the problems of low load quality, failure to satisfy the gravity balance conditions at various angles, excessive cumbersome adjustment process and reducing work efficiency of the existing exoskeleton robot, an object of the present invention is to provide a load-adapting passive balance upper limb exoskeleton.

According to the present invention, a load-adapting passive balancing upper limb exoskeleton includes: an upper arm, an elbow joint, a forearm, a hand, an upper arm support rod and a forearm support rod;

the upper arm includes an upper arm upper rod, an upper arm lower rod, a shoulder joint and an upper arm drive mechanism, the upper arm drive mechanism comprises a rear end mounting member, a gas spring top plate, a gas spring, a gas spring sliding rail, a connecting plate, two upper arm support rod sliding rails, two upper arm support rod sliding block and two gas spring sliding blocks, a rear end of a cylinder body of the gas spring is fixedly mounted to the rear end mounting member, a piston rod of the gas spring is fixedly mounted to the gas spring top plate, the connecting plate is fixedly installed at a left side of the gas spring top plate, one of the gas spring sliding block is fixedly mounted to the connecting plate, both two of the gas spring sliding blocks is slidably connected to the gas spring sliding rail, the gas spring sliding rail is fixedly connected to the upper arm lower rod, the two upper arm support rod sliding rails are arranged in parallel along a top and a bottom side and is fixedly mounted at a right side of the gas spring top plate, the two upper arm support rod sliding rails and the two upper arm support rod sliding block are corresponding to each other, the two upper arm support rod sliding block are slidably connected to the two upper arm support rod sliding rails, the upper arm upper rod has the same structure as the upper arm lower rod, the upper arm upper rod and the upper arm lower rod are symmetrically positioned at a top and a bottom end of the shoulder joint, the should joint is positioned at a left side of the upper arm upper rod and the upper arm lower rod while the shoulder joint is hinged to the upper arm upper rod and the upper arm lower rod respectively through bearings, the upper arm drive mechanism is arranged in the upper arm lower rod, and both the rear end mounting member of the upper arm drive mechanism and the two gas spring sliding blocks of the upper arm drive mechanism are fixedly connected to the upper arm lower rod;

the forearm comprises a forearm upper rod, a forearm lower rod, a wrist joint and a forearm drive mechanism, the forearm drive mechanism has the same structure as the upper arm drive mechanism, the forearm upper rod has the same structure as the forearm lower rod, the forearm upper rod and the forearm lower rod are symmetrically positioned at a top and a bottom end of the wrist joint, the wrist joint is positioned at a right side of the forearm upper rod and the forearm lower rod while the wrist joint is hinged to the forearm upper rod and the forearm lower rod respectively through bearings, the forearm drive mechanism is arranged on the forearm upper rod, and both the rear end mounting member of the forearm drive mechanism and the two gas spring sliding blocks of the forearm drive mechanism are fixedly connected to the upper arm lower rod;

the elbow joint comprises upper arm elbow joint assembly, forearm elbow joint assembly, an elbow joint drive mechanism, an upper arm transition gear, an upper arm transition gear shaft, a forearm transition gear, a forearm transition gear shaft, and two roller bearings; the upper arm elbow joint assembly comprises an upper arm screw nut, an upper arm screw nut connector, a bottom ball bearing for upper arm, an upper arm elbow joint housing, an upper arm screw, an upper arm top ball bearing, an upper arm transmission gear and two upper arm needle roller thrust bearings, the upper arm screw nut is screwed to the upper arm screw, and an upper end of the upper arm screw is sequentially provided with two upper arm needle roller thrust bearings and the upper arm top ball bearing from an inner side to an outer side, a lower end of the upper arm screw is sequentially provided with the upper arm screw nut connector and the bottom ball bearing for upper arm from the inner side to the outer side, the upper arm screw nut is fixedly connected to the upper arm screw nut connector, all of the upper arm ball bearing, the bottom ball bearing for upper arm and the two upper arm needle roller thrust bearings are supported in the upper arm elbow joint housing, the lower end of the upper arm screw is exposed outside the upper arm elbow joint housing and fixedly connected with the upper arm transmission gear, the forearm elbow joint assembly comprises a forearm transmission gear, a forearm elbow joint housing, forearm screw nut, a forearm screw nut connector, a forearm top ball bearing, a forearm screw, two forearm needle roller thrust bearings; the forearm screw nut is screwed to the forearm screw, and an upper end of the forearm screw is provided with the forearm screw nut connector, a lower end of the forearm screw is provided with the two forearm needle roller thrust bearings, the forearm screw nut is fixedly connected to the forearm screw nut connector, the forearm screw nut connector is coupled to the forearm screw, both of the forearm top ball bearing and the two forearm needle roller thrust bearings are supported in the forearm elbow joint housing, the lower end of the forearm screw is exposed outside the forearm elbow joint housing and fixedly connected with the forearm transmission gear, the elbow joint drive mechanism includes a reducer output gear, a reducer housing, a main shaft, a motor, and a reducer; the reducer is disposed in the reducer housing, an input terminal of the reducer is connected to the motor, an output terminal of the reducer is connected to the main shaft, the reducer output gear is fixedly connected to the main shaft; the upper arm elbow joint assembly and the forearm elbow joint assembly are disposed on the left and right sides of the elbow joint drive mechanism, the reducer housing is fixedly connected to the upper arm elbow joint housing and the forearm elbow joint housing, the upper arm transition gear is disposed between the reducer output gear and the upper arm transmission gear while the upper arm transition gear is meshed with both of the reducer output gear and the upper arm transmission gear, the upper arm transition gear is connected to the upper arm transition gear shaft through one of the roller bearing B8, the upper arm transition gear shaft is fixedly connected to the upper arm elbow joint housing, the forearm transition gear is disposed between the reducer output gear and the forearm transmission gear while the forearm transition gear is meshed with both of the reducer output gear and the forearm transmission gear, the forearm transition gear is connected to the forearm transition gear shaft through another roller bearing B8, the forearm transition gear shaft is fixedly connected to the forearm elbow joint housing;

the upper arm, the elbow joint, the forearm and the hand are arranged in order from a left side to a right side direction, the upper arm upper rod and the upper arm lower rod is hinged to the upper arm elbow joint housing through a bearing respectively, the forearm upper rod and a forearm lower rod are hinged to the forearm elbow joint housing through bearings, the upper arm support rod is disposed between upper arm drive mechanism and upper arm elbow joint assembly, the upper arm support rod has one end fixedly connected to the two upper arm support rod sliding block of the upper arm drive mechanism and another end is hinged to an extending shaft at two sides of the upper arm screw nut connector through a bearing, the forearm support rod is disposed between the forearm drive mechanism and the forearm elbow joint assembly, the forearm support rod has one end fixedly connected to the two upper arm support rod sliding blocks of the forearm drive mechanism and another end is hinged to an extending shaft at two sides of the forearm screw nut connector through a bearing, the hand is hinged to the wrist joint.

Compared with the existing arts, the present invention has the following advantages:

1. The present invention utilizes the constant force outputted from a gas spring to achieve the perfectly balance effect at all angles during the rotation process.

2. Because the gas spring is a passive energy storage device with relatively higher power density, compared with a spring structure, the load capacity and compactness of the equipment are greatly improved, and the load capacity of a single arm can reach 25 kg or above.

3. The introduction of the motor automatic adjustment feedback system enables the present invention to have a fast switching capability when the carrying heavy loads changes, which greatly improves the work efficiency and expands its applicable application.

4. The structure of the invention can balance the gravity generated by the weight of the goods and reduce the load of the upper limb of the human body.

DETAILED DESCRIPTION OF THE PREFERRED EMBODIMENT

Figure 1:
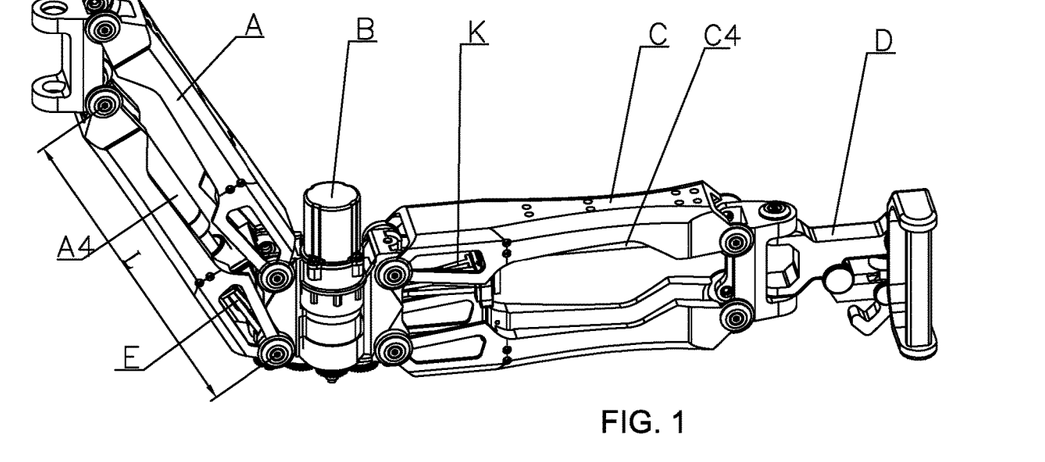
FIG. 1 is a schematic view showing the entire structure of the present invention.
Figure 2:
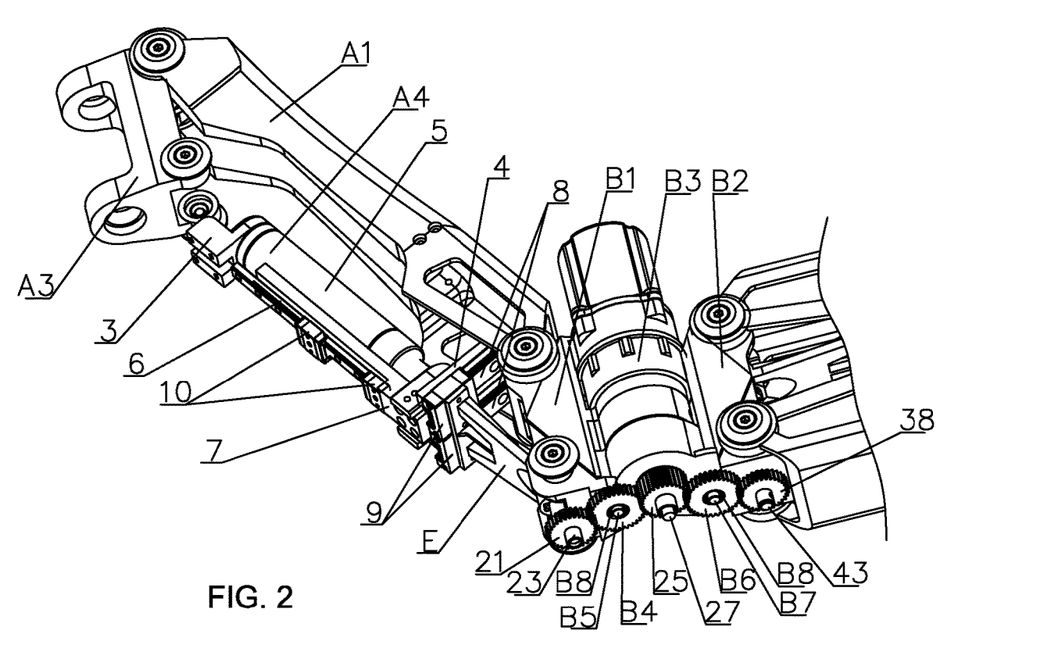
FIG. 2 is a schematic view showing the connection relationship between an upper arm A and an elbow joint (excluding the upper arm lower rod A2)
Figure 3:
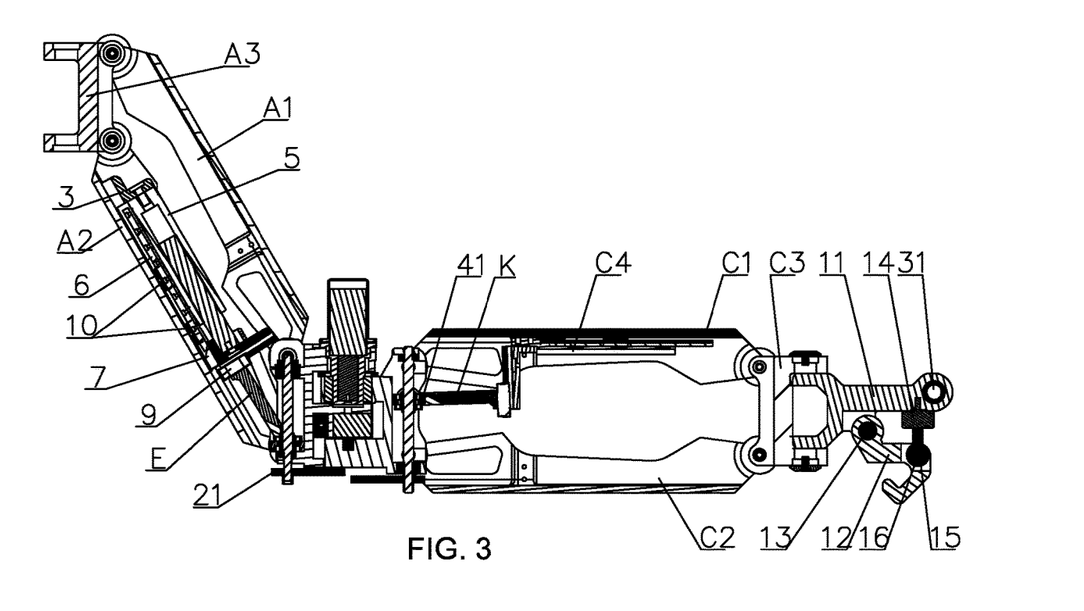
FIG. 3 is a front sectional view of the present invention.
Figure 4:
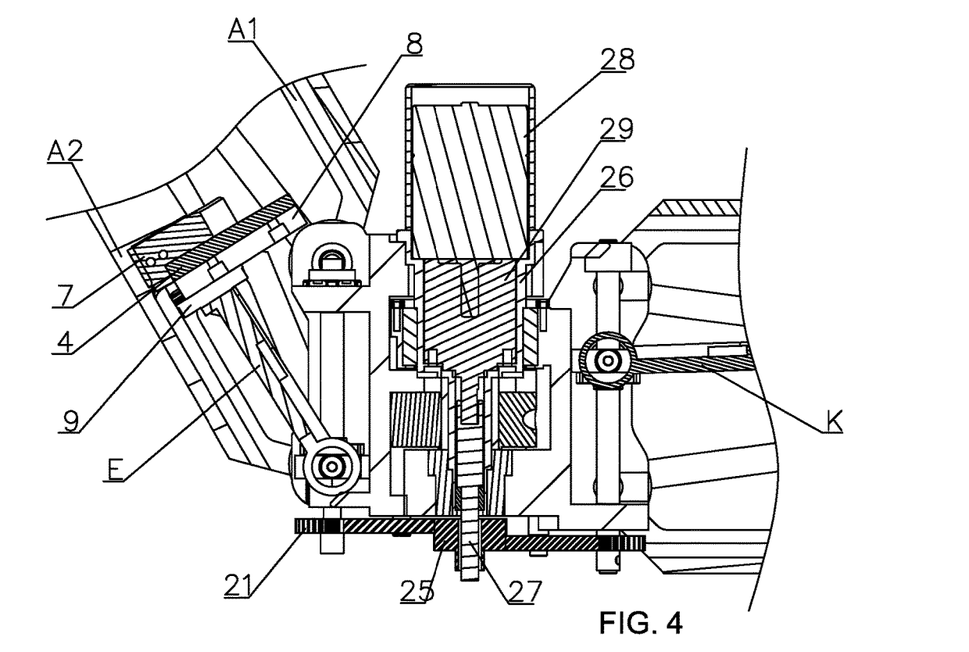
FIG. 4 is a front sectional view of the elbow joint drive mechanism B3.
Figure 5:
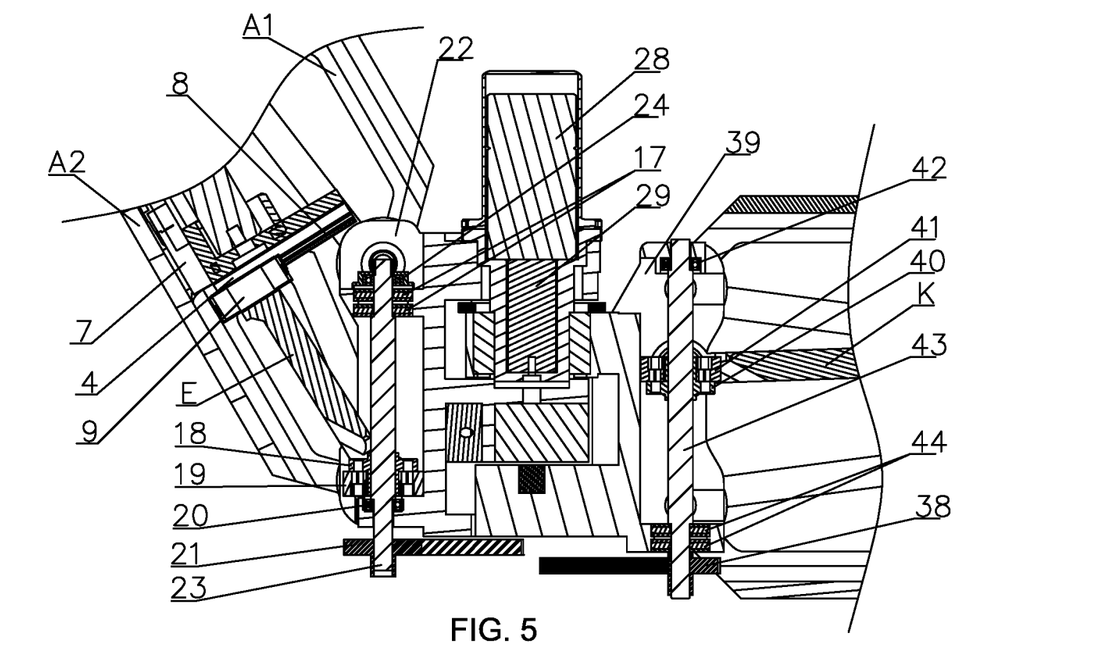
FIG. 5 is a front sectional view of the elbow joint.
Figure 7:
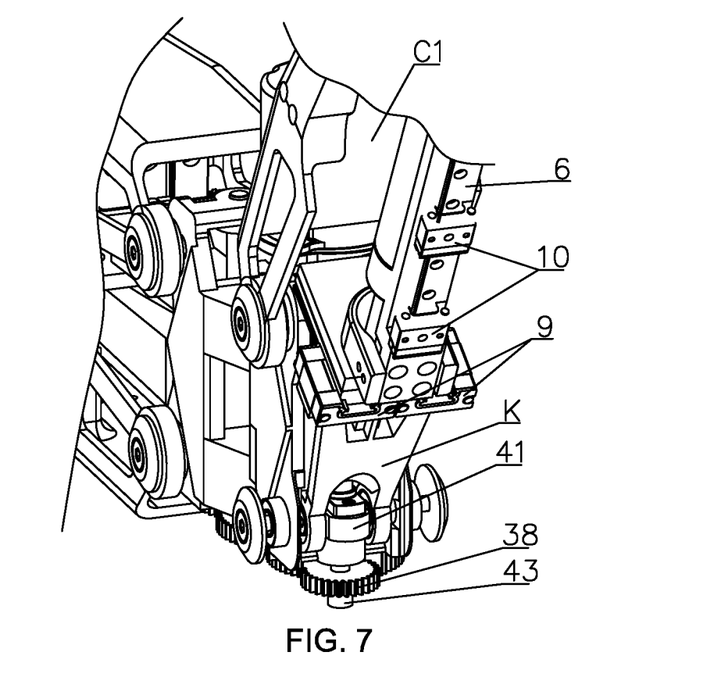
FIG. 7 is a perspective view showing the connection relationship between the forearm support rod K, the forearm drive mechanism C4, and the forearm elbow joint assembly B2.
Figure 8:
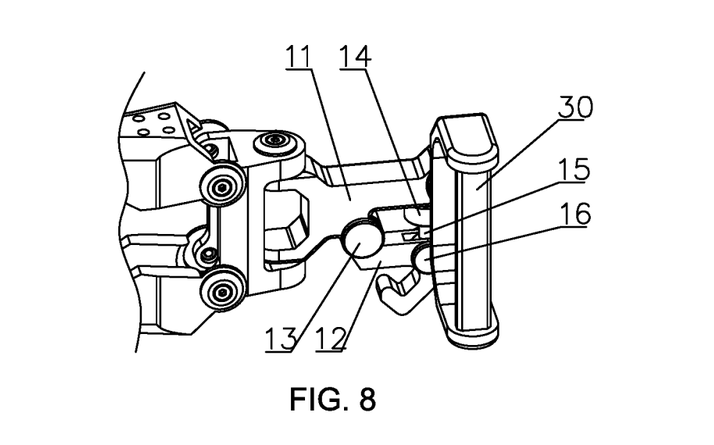
FIG. 8 is a structural perspective view of the hand D.
Figure 9:
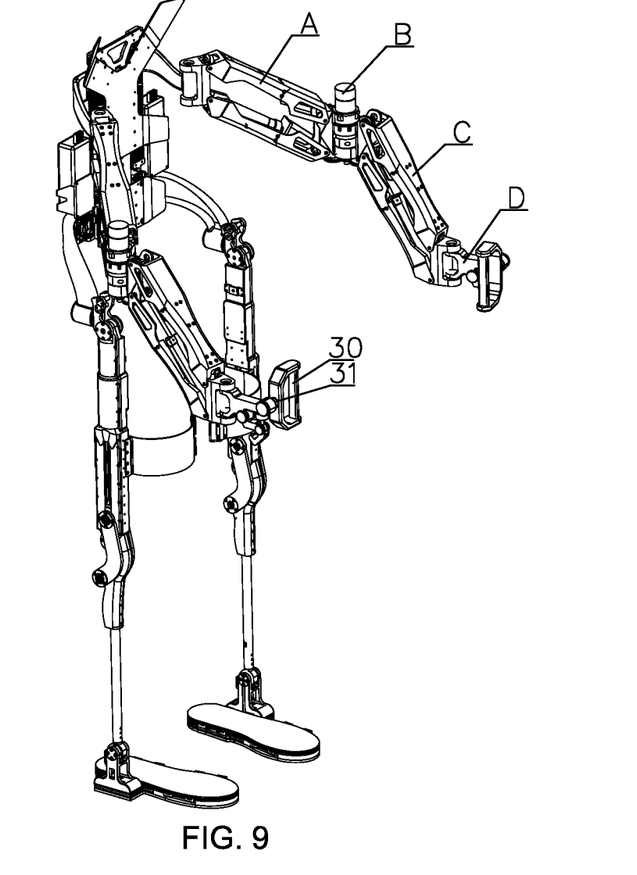
FIG. 9 is a schematic diagram showing the in-use condition of the present invention.

Embodiment 1: This embodiment will be described with reference to FIGS. 1 to 8. According to this embodiment, the present invention includes an upper arm A, an elbow joint, a forearm C, a hand D, an upper arm support rod E, and a forearm support rod K;

The upper arm A comprises an upper arm upper rod A1, an upper arm lower rod A2, a shoulder joint A3 and an upper arm drive mechanism A4. The upper arm drive mechanism A4 comprises a rear end mounting member 3, a gas spring top plate 4, a gas spring 5, a gas spring sliding rail 6, a connecting plate 7, two upper arm support rod sliding rails 8, two upper arm support rod sliding blocks 9 and two gas spring sliding blocks 10. A rear end of a cylinder body of the gas spring 5 is fixedly mounted to the rear end mounting member 3, a piston rod of the gas spring 5 is fixedly mounted to the gas spring top plate 4, the connecting plate 7 is fixedly installed at a left side of the gas spring top plate 4, one of the gas spring sliding block 10 is fixedly mounted to the connecting plate 7, both two of the gas spring sliding blocks 10 is slidably connected to the gas spring sliding rail 6, the gas spring sliding rail 6 is fixedly connected to the upper arm lower rod A2, the two upper arm support rod sliding rails 8 are arranged in parallel along a top and a bottom side and is fixedly mounted at a right side of the gas spring top plate 4, the two upper arm support rod sliding rails 8 and the two upper arm support rod sliding blocks 9 are corresponding to each other, the two upper arm support rod sliding blocks 9 are slidably connected to the two upper arm support rod sliding rails 8, the upper arm upper rod A1 has the same structure as the upper arm lower rod A2, the upper arm upper rod A1 and the upper arm lower rod A2 are symmetrically positioned at a top and a bottom end of the shoulder joint A3, the should joint A3 is positioned at a left side of the upper arm upper rod A1 and the upper arm lower rod A2 while the shoulder joint A3 is hinged to the upper arm upper rod A1 and the upper arm lower rod A2 respectively through bearings, the upper arm drive mechanism A4 is arranged in the upper arm lower rod A2, and both the rear end mounting member 3 of the upper arm drive mechanism A4 and the two gas spring sliding blocks 10 of the upper arm drive mechanism A4 are fixedly connected to the upper arm lower rod 2;

The forearm C comprises a forearm upper rod C1, a forearm lower rod C2, a wrist joint C3 and a forearm drive mechanism C4. The forearm drive mechanism C4 has the same structure as the upper arm drive mechanism A4, the forearm upper rod C1 has the same structure as the forearm lower rod C2, the forearm upper rod C1 and the forearm lower rod C2 are symmetrically positioned at a top and a bottom end of the wrist joint C3, the wrist joint C3 is positioned at a right side of the forearm upper rod C1 and the forearm lower rod C2 while the wrist joint C3 is hinged to the forearm upper rod C1 and the forearm lower rod C2 respectively through bearings, the forearm drive mechanism C4 is arranged in the forearm upper rod C1, and both the rear end mounting member 3 of the forearm drive mechanism C4 and the two gas spring sliding blocks 10 of the forearm drive mechanism C4 is fixedly connected to the upper arm lower rod 2;

The elbow joint B comprises upper arm elbow joint assembly B1, forearm elbow joint assembly B2, an elbow joint drive mechanism B3, an upper arm transition gear B4, an upper arm transition gear shaft B5, a forearm transition gear B6, a forearm transition gear shaft B7, and two roller bearings B8; the upper arm elbow joint assembly B1 comprises an upper arm screw nut 18, an upper arm screw nut connector 19, a bottom ball bearing for upper arm 20, an upper arm elbow joint housing 22, an upper arm screw 23, an upper arm top ball bearing 24, an upper arm transmission gear 21 and two upper arm needle roller thrust bearings 17; the upper arm screw nut 18 is screwed to the upper arm screw 23, and an upper end of the upper arm screw 23 is sequentially provided with two upper arm needle roller thrust bearings 17 and the upper arm top ball bearing 24 from an inner side to an outer side, a lower end of the upper arm screw 23 is sequentially provided with the upper arm screw nut connector 19 and the bottom ball bearing for upper arm 20 from the inner side to the outer side, the upper arm screw nut 18 is fixedly connected to the upper arm screw nut connector 19, all of the upper arm ball bearing 24, the bottom ball bearing for upper arm 20 and the two upper arm needle roller thrust bearings 17 are supported in the upper arm elbow joint housing 22, the lower end of the upper arm screw 23 is exposed outside the upper arm elbow joint housing 22 and fixedly connected with the upper arm transmission gear 21. In this way, a rotation movement can be transmitted to the upper arm screw 23 through the upper arm transmission gear 21 so that the upper arm screw nut 18 can drive the upper arm screw nut connector 19 to move up and down; the forearm elbow joint assembly (B2) comprises a forearm transmission gear 38, a forearm elbow joint housing 39, forearm screw nut 40, a forearm screw nut connector 41, a forearm top ball bearing 42, a forearm screw 43, two forearm needle roller thrust bearings 44, the forearm screw nut 40 is screwed to the forearm screw 43, and an upper end of the forearm screw 43 is provided with the forearm screw nut connector 41, a lower end of the forearm screw 43 is provided with the two forearm needle roller thrust bearings 44, the forearm screw nut 40 is fixedly connected to the forearm screw nut connector 41, the forearm screw nut connector 41 is coupled to the forearm screw 43, both of the forearm top ball bearing 42 and the two forearm needle roller thrust bearings 44 are supported in the forearm elbow joint housing 39, the lower end of the forearm screw 43 is exposed outside the forearm elbow joint housing 39 and fixedly connected with the forearm transmission gear 38. In this way, a rotation movement can be transmitted to the forearm screw 43 through the forearm transmission gear 38 so that the forearm screw nut 40 can drive the forearm screw nut connector 41 to move up and down, the elbow joint drive mechanism B3 includes a reducer output gear 25, a reducer housing 26, a main shaft 27, a motor 28, and a reducer 29, the reducer 29 is disposed in the reducer housing 26, an input terminal of the speed reducer 29 is connected to the motor 28, an output terminal of the reducer 29 is connected to the main shaft 27, the reducer output gear 25 is fixedly connected to the main shaft 27, the upper arm elbow joint assembly B1 and the forearm elbow joint assembly B2 are disposed on the left and right sides of the elbow joint drive mechanism B3, the reducer housing 26 is fixedly connected to the upper arm elbow joint housing 22 and the forearm elbow joint housing 39, the upper arm transition gear B4 is disposed between the reducer output gear 25 and the upper arm transmission gear 21 while the upper arm transition gear B4 is meshed with both of the reducer output gear 25 and the upper arm transmission gear 21, the upper arm transition gear B4 is connected to the upper arm transition gear shaft B5 through one of the roller bearing B8, the upper arm transition gear shaft B5 is fixedly connected to the upper arm elbow joint housing 22, the forearm transition gear B6 is disposed between the reducer output gear 25 and the forearm transmission gear 38 while the forearm transition gear B6 is meshed with both of the reducer output gear 25 and the forearm transmission gear 38, the forearm transition gear B6 is connected to the forearm transition gear shaft B7 through another roller bearing B8, the forearm transition gear shaft B7 is fixedly connected to the forearm elbow joint housing 39;

the upper arm A, the elbow joint, the forearm C and the hand D are arranged in order from a left to a right direction, the upper arm upper rod A1 and the upper arm lower rod A2 are hinged to the upper arm elbow joint housing 22 through bearings respectively, the forearm upper rod C1 and a forearm lower rod C2 are hinged to the forearm elbow joint housing 39 through bearings, the upper arm support rod E is disposed between upper arm drive mechanism A4 and upper arm elbow joint assembly B1, the upper arm support rod E has one end fixedly connected to the two upper arm support rod sliding blocks 9 of the upper arm drive mechanism A4 and another end hinged to an extending shaft at two sides of the upper arm screw nut connector 19 through bearings, the forearm support rod K is disposed between the forearm drive mechanism C4 and the forearm elbow joint assembly B2, the forearm support rod K has one end fixedly connected to the two upper arm support rod sliding blocks 9 of the forearm drive mechanism C4 and another end hinged to extending shafts at two sides of the forearm screw nut connector 41 through bearings, the hand D is hinged to the wrist joint C3.

Figure 6:
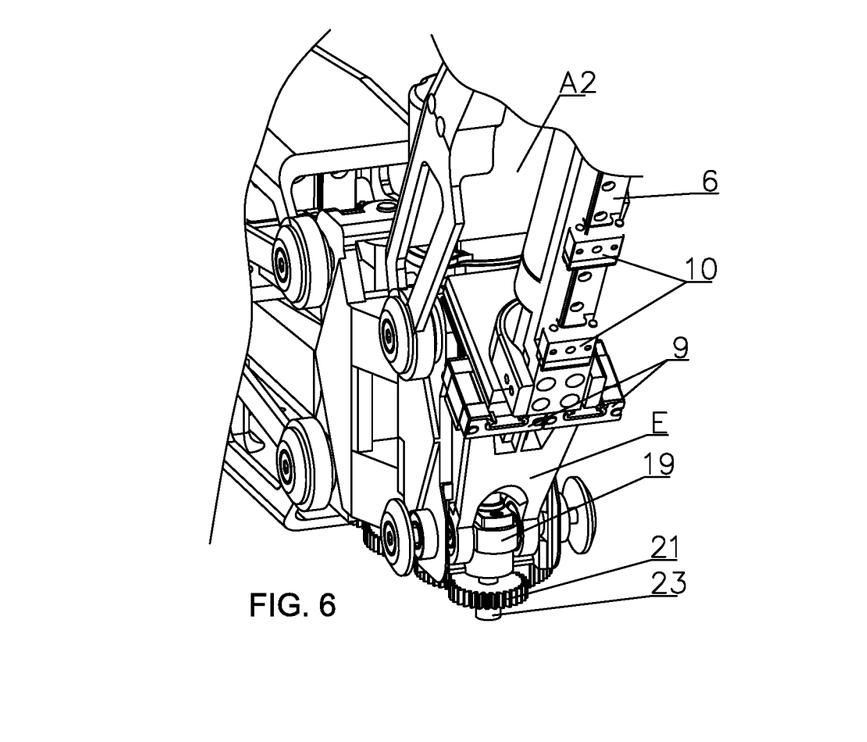
FIG. 6 is a perspective view showing the connection relationship between the upper arm support rod E, the upper arm drive mechanism A4, and the upper arm elbow joint assembly B1.

When the upper arm support rod E is rotated under a traction of a human, a relative sliding movement between the upper arm support rod sliding blocks 9 and the upper arm support rod sliding rails 8 is driven while the gas spring top plate 4 is driven to move along a direction of extension and retraction of the piston of the gas spring 5, then a telescopic movement of the piston of the gas spring 5 is produced.

Embodiment 2: This embodiment will be described with reference to FIG. 3 and FIG. 8. According to this embodiment of the present invention, the hand D comprises a wrist connecting frame 11, a load hook 12, a first pin shaft 13, a force sensor 14, a lug 15, a second pin shaft 16, a hand grip 30 and a third pin shaft 31; the load hook 12 is disposed below the wrist connecting frame 11 and the load hook 12 is hinged to the wrist connecting frame 11 through the first pin shaft 13, the force sensor 14 is disposed between the load hook 12 and the wrist connecting frame 11 and the force sensor 14 has an upper end is insert and connected to the wrist connecting frame 11, the force sensor 14 has a lower end screwed to the lug 15, the lug 15 is hinged to the load hook 12 through the second pin shaft 16 and is screwed to the wrist connecting frame 11 through the third pin shaft 31. In this way, when the load hook 12 is loaded with a heavy item, through the lever action, the force sensor 14 will be stretched to achieve the function of mass measurement. The hand grip 30 has a freedom of flipping. Other components and connection relationship are the same as the embodiment 1.

Embodiment 3: This embodiment will be described with reference to FIG. 3. According to this embodiment of the present invention, a diameter and a pitch of the upper arm screw 23 and the forearm screw 43 are the same. In this way, it can be ensured that the upper arm A and the forearm C will rotate synchronously. Other components and connection relationship are the same as the embodiment 1 or embodiment 2.

Figure 10:
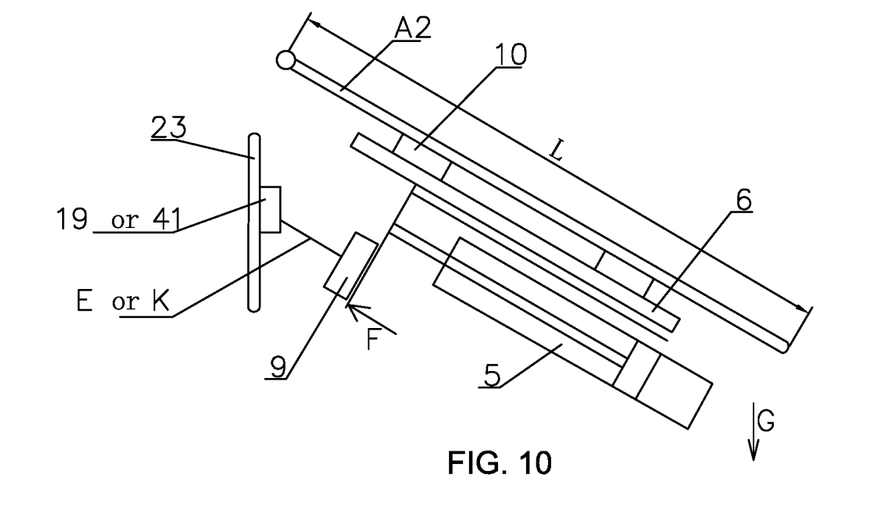
FIG. 10 is a schematic diagram showing the structural principle of the present invention.

The working principle of the present invention:

On the upper arm A, a parallelogram is formed by the hinge connection of the four members of the upper arm upper rod A1, the shoulder joint A3, the upper arm lower rod A2, and the upper arm elbow joint housing 22. By using the principle as shown in FIG. 10 of the drawings, the telescopic movement of the gas spring 5 is changed to the rotational motion of the hand D, and its relationship with gravity can be calculated and obtained as F*H=G*L, where F refers to the thrust value of the gas spring piston, H refers to a distance of the screw nut 18 from the rotating shaft of the arm connecting rod, G refers to a gravity of the heavy item, L refers to a distance from the hinge center of the upper arm upper rod A1 and shoulder joint A3 to the hinge center of the upper arm upper rod A1 and the upper arm elbow joint housing 22 (or from the hinge center of the upper arm lower rod A2 and the shoulder joint A3 to the hinge center of the upper arm lower rod A2 and the upper arm elbow joint housing 22). By F*H=G*L, a balance effect for different weight can be achieved. The motor 28 rotates, and the motion is transmitted to the upper arm transmission gear 21 and the forearm transmission gear 38 via the upper arm transition gear B4 and the forearm transition gear B6 respectively through the reducer output gear 25, and the upper arm transmission gear 21 can transmit the rotation to the upper arm screw 23 so that the upper arm screw nut 18 can drive the upper arm screw nut connector 19 to move upwardly and downwardly. In this way, the adjustment of H is realized. In the actual working condition, based on the data collected by the end force sensor 14, H can be adjusted in real time to satisfy the balance effect, and the condition of passive equilibrium gravity has been achieved.

The principle of the forearm C is the same as that of the upper arm A.

What is claimed is:

1. A load-adapting passive balancing upper limb exoskeleton, wherein said upper limb exoskeleton comprises an upper arm, an elbow joint, a forearm, a hand, an upper arm support rod, and a forearm support rod;

said upper arm comprises an upper arm upper rod, an upper arm lower rod, a shoulder joint and an upper arm drive mechanism;

said upper arm drive mechanism comprises a rear end mounting member, a gas spring top plates, a gas spring, a gas spring sliding rail, a connecting plate, two upper arm support rod sliding rails, two upper arm support rod sliding blocks and two gas spring sliding blocks, wherein a rear portion of a cylinder body of said gas spring is fixedly mounted to said rear end mounting member, a piston rod of said gas spring is fixedly mounted to said gas spring top plate, said connecting plate is fixedly installed at a left side of said gas spring top plate, one said gas spring sliding block is fixedly mounted to said connecting plate, both two said gas spring sliding blocks are slidably connected to gas spring sliding railing, said gas spring sliding rail is fixedly connected to said upper arm lower rod, said two upper arm support rod sliding rails are arranged in parallel along a top and a bottom side and is fixedly mounted to a right side of said gas spring top plate, said two upper arm support rod sliding rails and said two upper arm support rod sliding blocks are corresponding to each other respectively, said upper arm support rod sliding block are slidably connected to said upper arm support rod sliding rail, said upper arm upper rod and said upper arm lower rod have the same structure, said upper arm upper rod and said upper arm lower rod are symmetrically positioned at a top and a bottom end of said shoulder joint respectively, said should joint is positioned at a left side of said upper arm upper rod and said upper arm lower rod while said shoulder joint is hinged to said upper arm upper rod and said upper arm lower rod respectively through bearings, said upper arm drive mechanism is arranged in said upper arm lower rod, and both said rear end mounting member of said upper arm drive mechanism and said two gas spring sliding blocks of said upper arm drive mechanism are fixedly connected to said upper arm lower rod;

said forearm comprises a forearm upper rod, a forearm lower rod, a wrist joint and a forearm drive mechanism, said forearm drive mechanisms and said upper arm drive mechanism have the same structure, said forearm upper rod and said forearm lower rod have the same structure, said forearm upper rod and said forearm lower rod are symmetrically positioned at a top and a bottom end of said wrist joint, said wrist joint is positioned at a right side of said forearm upper rod and said forearm lower rod while said wrist joint is hinged to said forearm upper rod and said forearm lower rod respectively through bearings, said forearm drive mechanism is arranged in said forearm upper rod, and both said rear end mounting member of said forearm drive mechanism and said two gas spring sliding blocks of said forearm drive mechanism is fixedly connected to said upper arm lower rod;

said elbow joint comprises upper arm elbow joint assembly, forearm elbow joint assembly, an elbow joint drive mechanism, an upper arm transition gear, an upper arm transition gear shaft, a forearm transition gear, a forearm transition gear shaft, and two roller bearings, said upper arm elbow joint assembly comprises an upper arm screw nut, an upper arm screw nut connector, a bottom ball bearing for upper arm, an upper arm elbow joint housing, an upper arm screw, a upper arm top ball bearing, an upper arm transmission gear and two upper arm needle roller thrust bearings, said upper arm screw nut is screwed to said upper arm screw, an upper end of said upper arm screw is sequentially provided with two upper arm needle roller thrust bearings and said upper arm top ball bearing from an inner side to an outer side of said upper arm screw, a lower end of said upper arm screw is sequentially provided with said upper arm screw nut connector and said upper arm bottom ball bearing from said inner side to said outer side, said upper arm screw nut is fixedly connected to said upper arm screw nut connector, all said upper arm ball bearing, said upper arm bottom ball bearing and said two upper arm needle roller thrust bearings are supported in said upper arm elbow joint housing, said lower end of said upper arm screw is exposed outside said upper arm elbow joint housing and is fixedly connected with said upper arm transmission gear, said forearm elbow joint assembly comprises a forearm transmission gear, a forearm elbow joint housing, forearm screw nut, a forearm screw nut connector, a forearm top ball bearing, a forearm screw, two forearm needle roller thrust bearing, said forearm screw nut is screwed to said forearm screw, an upper end of said forearm screw is provided with said forearm screw nut connector, a lower end of said forearm screw is provided with said two forearm needle roller thrust bearings, said forearm screw nut is fixedly connected to said forearm screw nut connector, said forearm screw nut connector is coupled to said forearm screw, both said forearm top ball bearing and said two forearm needle roller thrust bearings are supported in said forearm elbow joint housing, said lower end of said forearm screw is exposed outside said forearm elbow joint housing and is fixedly connected with said forearm transmission gear; said elbow joint drive mechanism includes a reducer output gear, a reducer housing, a main shaft, a motor, and a reducer, said reducer is disposed in said reducer housing, an input terminal of said reducer is connected to said motor, an output terminal of said reducer is connected to said main shaft, said reducer output gear is fixedly connected to said main shaft; said upper arm elbow joint assembly and said forearm elbow joint assembly are disposed on left and right sides of said elbow joint drive mechanism respectively, said reducer housing is fixedly connected to said upper arm elbow joint housing and said forearm elbow joint housing, said upper arm transition gear is disposed between said reducer output gear and said upper arm transmission gear while said upper arm transition gear is meshed with both said reducer output gear and said upper arm transmission gear said upper arm transition gear is connected to said upper arm transition gear shaft through one of said two roller bearings, said upper arm transition gear shaft is fixedly connected to said upper arm elbow joint housing, said forearm transition gear is disposed between said reducer output gear and said forearm transmission gear while said forearm transition gear is meshed with both said reducer output gear and said forearm transmission gear, said forearm transition gear, is connected to said forearm transition gear shaft through another one of said two roller bearings, said forearm transition gear shaft is fixedly connected to said forearm elbow joint housing;

said upper arm, said elbow joint, said forearm and said hand are arranged in order from a left to a right direction, said upper arm upper rod and said upper arm lower rode are hinged to said upper arm elbow joint housing through bearings respectively, said forearm upper rod and said forearm lower rod are hinged to said forearm elbow joint housing through bearings respectively, said upper arm support rod is disposed between said upper arm drive mechanism and said upper arm elbow joint assembly, while one end of said upper arm support rod is fixedly connected to said two upper arm support rod sliding blocks of said upper arm drive mechanism and another end of said upper arm support rod is hinged to extending shafts extended from two sides of said upper arm screw nut connector through bearings, said forearm support rod is disposed between said forearm drive mechanism and said forearm elbow joint assembly, while one end of said forearm support rod is fixedly connected to said two upper arm support rod sliding blocks of said forearm drive mechanism and another end of said forearm drive mechanism is hinged to extending shafts extended from two sides of said forearm screw nut connector through bearings, said hand is hinged to said wrist joint.

2. The load-adapting passive balancing upper limb exoskeleton according to claim 1, wherein said hand comprises a wrist connecting frame, a load hook, a first pin shaft, a force sensor, a lug, a second pin shaft, a hand grip and a third pin shaft, wherein said load hook is disposed below said wrist connecting frame while said load hook is hinged to said wrist connecting frame through said first pin shaft, said force sensor is disposed between said load hook and said wrist connecting frame while an upper end of said force sensor is inserted to said wrist connecting frame and a lower end of said force sensor is screwed to said lug, said lug is hinged to said load hook through said second pin shaft and is hinged to said wrist connecting frame through said third pin shaft.

3. The load-adapting passive balancing upper limb exoskeleton according to claim 1, wherein a diameter and a pitch of said upper arm screw are identical to a diameter and a pitch of said forearm screw respectively.

* * * * *